United States Patent
Fenoglio et al.

(10) Patent No.: US 10,484,410 B2
(45) Date of Patent: Nov. 19, 2019

(54) ANOMALY DETECTION FOR MICRO-SERVICE COMMUNICATIONS

(71) Applicant: Cisco Technology, Inc., San Jose, CA (US)

(72) Inventors: Enzo Fenoglio, Issy-les-Moulineaux (FR); Jérôme Tollet, Paris (FR); Syed Muhammad Mohsin Kazmi, Evry (FR); Hugo M. Latapie, Long Beach, CA (US)

(73) Assignee: Cisco Technology, Inc., San Jose, CA (US)

(*) Notice: Subject to any disclaimer, the term of this patent is extended or adjusted under 35 U.S.C. 154(b) by 191 days.

(21) Appl. No.: 15/653,689

(22) Filed: Jul. 19, 2017

(65) Prior Publication Data

US 2019/0028496 A1 Jan. 24, 2019

(51) Int. Cl.
*G08B 23/00* (2006.01)
*G06F 12/16* (2006.01)
*G06F 12/14* (2006.01)
*G06F 11/00* (2006.01)
(Continued)

(52) U.S. Cl.
CPC ...... *H04L 63/1425* (2013.01); *H04L 63/1408* (2013.01); *H04L 43/026* (2013.01); *H04L 43/12* (2013.01); *H04L 63/14* (2013.01); *H04L 63/1433* (2013.01); *H04L 63/1441* (2013.01); *H04L 63/20* (2013.01)

(58) Field of Classification Search
CPC . H04L 63/1425; H04L 43/12; H04L 63/1408; H04L 63/14; H04L 63/1433; H04L 63/1441; H04L 63/20

USPC .......................................................... 726/22
See application file for complete search history.

(56) References Cited

U.S. PATENT DOCUMENTS

| 8,880,893 B2 | 11/2014 | Moghe et al. |
| 9,509,782 B2 | 11/2016 | Lawson et al. |
| 9,769,213 B1 * | 9/2017 | Madisetti ............... H04L 63/20 |

(Continued)

FOREIGN PATENT DOCUMENTS

CN    103716288 A    4/2014

OTHER PUBLICATIONS

Wilhelm Hasselbring; Microservice Architectures for Scalability, Agility and Reliability in E-Commerce; IEEE; 2017; p. 243-246 (Year: 2017).*

(Continued)

*Primary Examiner* — Monjur Rahim
(74) *Attorney, Agent, or Firm* — Edell, Shapiro & Finnan, LLC

(57) ABSTRACT

Presented herein are techniques for detecting anomalies in micro-service communications that are indicative of security issues/problems for the application. More specifically, a computing device receives a plurality of micro-service communication records each associated with traffic sent between pairs of executables (nodes) that are related to a micro-services application. Each of the micro-service communication records includes a time series entry and an associated trace sequence identifier and each of the micro-service communication records are generated during a time period. The computing device analyzes the plurality of micro-service communications to detect possible anomalous communication patterns associated with the micro-services application during the time period.

20 Claims, 7 Drawing Sheets

(51) Int. Cl.
*H04L 29/06* (2006.01)
*H04L 12/26* (2006.01)

(56) References Cited

U.S. PATENT DOCUMENTS

| | | | |
|---|---|---|---|
| 2006/0218447 A1* | 9/2006 | Garcia | H04L 43/087 |
| | | | 714/39 |
| 2015/0379423 A1 | 12/2015 | Dirac et al. | |
| 2016/0283713 A1 | 9/2016 | Brech et al. | |
| 2018/0034779 A1* | 2/2018 | Ahuja | H04L 63/0254 |
| 2018/0034839 A1* | 2/2018 | Ahuja | H04L 41/0668 |
| 2018/0039555 A1* | 2/2018 | Salunke | G06F 11/3409 |
| 2018/0285250 A1* | 10/2018 | Helsley | G06F 11/3692 |

OTHER PUBLICATIONS

S. Hidaka, et al., "Analyzing Multimodal Time Series as Dynamical Systems", ICMI-MLMI'10, Nov. 8-12, 2010, Beijing, China, https://pdfs.semanticscholar.org/c41d/1a072b81ca68f48cf5efb4bc07a2ed9bd1ae.pdf, 8 pages.

S. Curley, et al., "Grammatical Inference and Machine Learning Approaches to Post-Hoc LangSec", http://spw16.langsec.org/papers/curley-posthoc-inference.pdf, 2016 IEEE Security and Privacy Workshops (SPW), May 22-26, 2016, San Jose, CA, DOI: 10.1109SPW.2016.26, 8 pages.

Asok Ray, "Symbolic dynamic analysis of complex systems for anomaly detection", Signal Processing, vol. 84, Issue 7, Jul. 2004, pp. 1115-1130, 16 pages.

\* cited by examiner

790

┌─────────────────────────────────────────────────────────────────────────┐
│ RECEIVING A PLURALITY OF MICRO-SERVICE COMMUNICATION RECORDS EACH ASSOCIATED WITH │
│ TRAFFIC SENT BETWEEN PAIRS OF EXECUTABLES THAT ARE RELATED TO A MICRO-SERVICES │ 792
│ APPLICATION, WHEREIN EACH OF THE MICRO-SERVICE COMMUNICATION RECORDS INCLUDES A TIME │
│ SERIES ENTRY AND AN ASSOCIATED TRACE SEQUENCE IDENTIFIER, AND WHEREIN THE EACH OF THE │
│ MICRO-SERVICE COMMUNICATION RECORDS ARE GENERATED DURING A TIME PERIOD │
└─────────────────────────────────────────────────────────────────────────┘
                                      │
                                      ▼
┌─────────────────────────────────────────────────────────────┐
│ ANALYZING THE PLURALITY OF MICRO-SERVICE COMMUNICATION RECORDS TO │ 794
│ DETECT POSSIBLE ANOMALOUS COMMUNICATION PATTERNS ASSOCIATED │
│ WITH THE MICRO-SERVICES APPLICATION DURING THE TIME PERIOD │
└─────────────────────────────────────────────────────────────┘

FIG.7

ANOMALY DETECTION FOR MICRO-SERVICE COMMUNICATIONS

TECHNICAL FIELD

The present disclosure relates to anomaly detection for micro-service communications.

BACKGROUND

The micro-service architecture (micro-services or microservices) refers to a computing architectural style in which software applications are deployed as modular services that each run a unique process to perform a discrete business function. The modular services are independent from one another and communicate through a lightweight mechanism, such as Application Program Interfaces (APIs). The microservice architecture is highly scalable and has revolutionized the way applications are being developed and deployed. For example, the micro-service architecture enables the continuous delivery/deployment/integration of large/complex applications and enables an enterprise/organization to evolve its technology stack.

A software/application container ("container") is a type of operating system level (OS-level) virtualization technique that allows an application and its dependencies to run as a resource-isolated process. That is, a container is a lightweight, stand-alone, executable package of a piece of software that includes everything needed to run the software, including code, runtime, system tools, system libraries, settings, etc. bundled into one package. Unlike virtual machines (VM), containers have no need for embedded operating systems and calls/requests are made for operating system resources via an API.

Containers and the micro-services architecture are distinct from one another, where a micro-service may run in a container, but a container need not be used for a microservice. However, containers have lightweight and portability properties which make them well suited for deploying micro-services. For example, container-based micro-services are being widely adopted in the Data Center/Cloud Industry where, rather than building a single monolithic application (i.e., a single-tiered software application that is self-contained and independent from other computing applications), the container-based micro-services split the application into a set of smaller, interconnected services.

BRIEF DESCRIPTION OF THE DRAWINGS

FIG. 7 is a flowchart illustrating a method, according to an example embodiment.

DESCRIPTION OF EXAMPLE EMBODIMENTS

Overview

Figure 1:
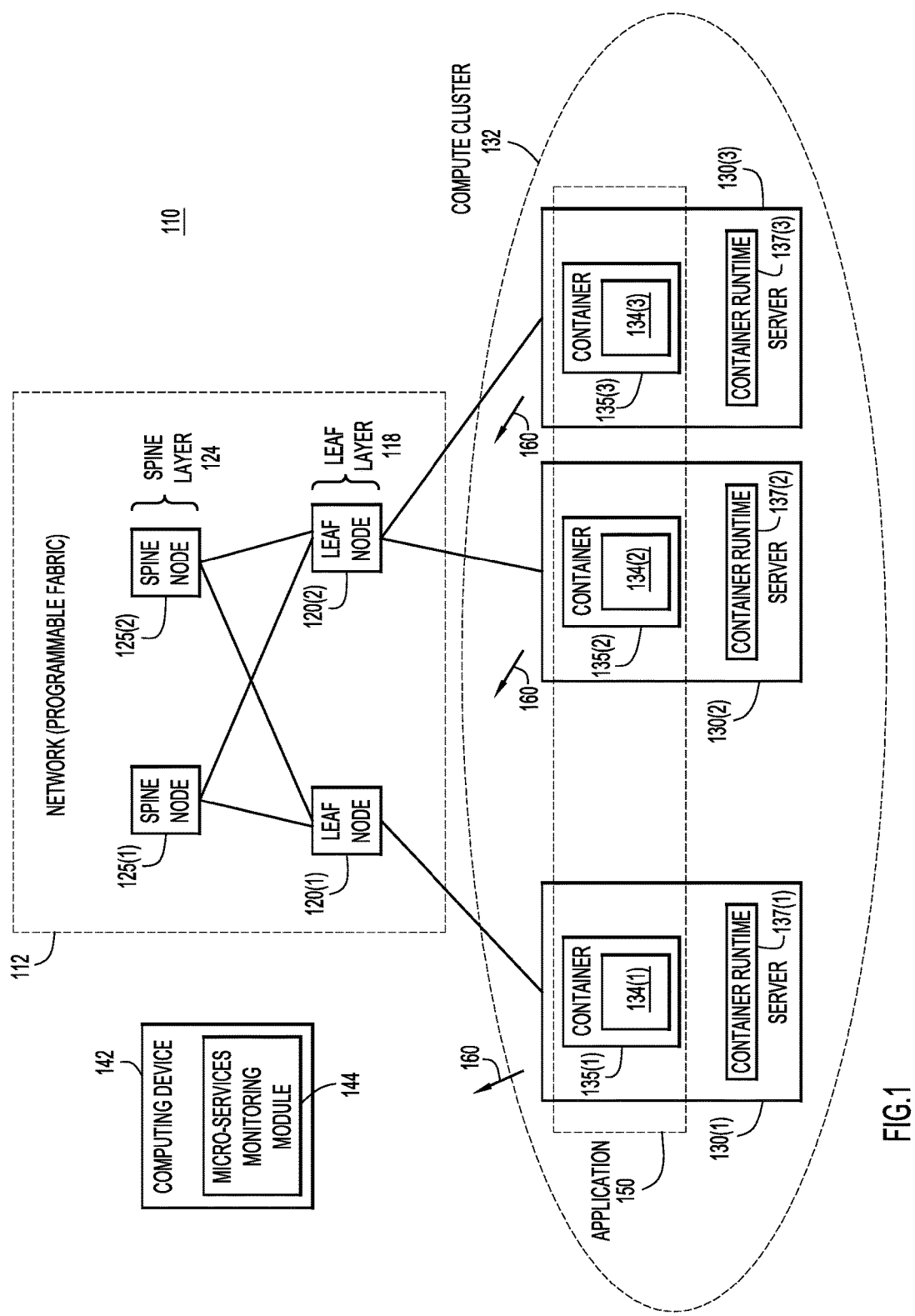
FIG. 1 is a block diagram illustrating a network environment configured to implement the techniques presented herein for monitoring micro-service communications for anomalies, according to an example embodiment.

Briefly, presented herein are techniques for detecting anomalies in micro-service communications that are indicative of security issues/problems. More specifically, a computing device receives a plurality of micro-service communication records each associated with traffic sent between pairs of executables (nodes) that are related to a microservices application. Each of the micro-service communication records includes a time series entry and an associated trace sequence identifier and each of the micro-service communication records are generated during a time period. The computing device analyzes the plurality of micro-service communications to detect possible anomalous communication patterns associated with the micro-services application during the time period.

Example Embodiments

The micro-services architecture is a new fundamental technique for writing applications where, instead of writing code in a "monolithic" manner (i.e., as a single-tiered and self-contained application that is independent form other computing applications), applications are disaggregated into small and loosely coupled micro-services. The micro-services communicate with one another using application program interfaces (APIs) over standard protocols, such as Hyper Text Transfer Protocol (HTTP), HTTP Secure (HTTPS), etc. The increased use of the micro-services architecture in application development has improved the ability to update and scale applications.

There are a number of publicly available container platforms/registries that make micro-services (e.g., databases, load balancers, etc.) available for use by application developers. As such, there is an increasing tendency for application developers to download micro-services, in forms of containers, from these publicly available container platforms and to incorporate the downloaded container-based microservices into their applications. While this programming model facilitates coding efficiency, it also introduces security issues. In particular, the application developers may not be intimate with the internal operations of the containers that are downloaded and incorporated into the application (e.g., when the pace of innovation leaves no time for proper security audits of the containers). As a result, the application developer may unknowingly introduce security threats into the core of the application that is being built.

Presented herein are techniques for securing an application that includes micro-services, such as downloaded container-based micro-services. In particular, the techniques presented herein monitor micro-service communications/ traffic (i.e., packets/bytes sent to and/or from micro-services within the application) to detect any deviation from a nominal/typical behavior of the application in terms of the communication patterns (i.e., detect an anomaly in the micro-service communications). Deviations from the typical behavior (communication patterns) are indicative of security issues/problems affecting the application.

In certain examples presented herein, a computing device receives a plurality of micro-service communication records and analyzes these communication records to detect possible anomalous communication patterns associated with the micro-services application. Each micro-service communication record includes a time series entry $S=\{S_1, \ldots, S_N\}$ of length N and an associated trace sequence identifier of the captured network traffic (i.e., flow characteristics of data exchanged between pairs of executables). A time series is represented by D-dimensional records defined by $S_i = \{X_i^1, \ldots, X_i^D\}$, and a trace sequence is defined as $Id = \{Id_1, \ldots, Id_N\}$, where a trace sequence is a multi-index representation of the trace sequence identifiers. Each trace sequence identifier $Id_i$ is represented by a 3-dimensional index defined by $Id_i = \{Id_i^1, Id_i^2, Id_i^3\}$.

Referring first to FIG. 1, shown is a block diagram illustrating a network environment 110 in which techniques in accordance with examples presented herein may be implemented. The network environment 110 includes a network (e.g. programmable fabric) 112 formed by a set of interconnected network devices/nodes (e.g., switches) in a leaf and spine architecture (e.g., CLOS network topology). More specifically, the network 112 comprises a leaf layer 118 comprised of leaf nodes (e.g., leaf switches) 120(1) and 120(2), and a spine layer 124 comprised of spine nodes (e.g., spine switches) 125(1) and 125(2).

In general, a leaf and spine architecture, such as that shown in FIG. 1, creates a low-latency, scalable programmable fabric. However, it is to be appreciated that the leaf and spine architecture of FIG. 1 is merely an example of a network architecture in which the techniques described herein may be implemented. It is also to be appreciated that the specific arrangement of FIG. 1 that includes two spine nodes and two leaf nodes is also illustrative and that other arrangements in accordance with examples presented herein may include different numbers of spine nodes, leaf nodes, and/or other devices.

In FIG. 1, a plurality of container-hosting computing (compute) devices are connected to the network 112. More specifically, a computing device 130(1) is connected to leaf switch 120(1) and computing devices 130(2) and 130(3) are each connected to the leaf switch 120(2). In accordance with examples presented herein, the computing devices 130(1)-130(3) are physical endpoints (e.g., servers) that collectively form a compute cluster 132. For ease of description, the computing devices 130(1)-130(3) are referred to herein as servers 130(1)-130(3).

The servers 130(1)-130(3) are configured to host one or more container-based micro-services 134. More specifically, server 130(1) hosts container-based micro-service 134(1), server 130(2) hosts container-based micro-service 134(2), and server 130(3) hosts container-based micro-service 134(3). The container-based micro-services 134(1)-134(3) are each formed as part of a respective application container 135(1), 135(2), and 135(3), which are stand-alone executable software packages that include the respective micro-service and everything needed to run the respective micro-service, including code, runtime, system tools, system libraries, settings, etc., bundled into the software package. The servers 130(1)-130(3) also include a container runtime 137(1), 137(2), and 137(3), respectively. The container runtimes 137(1)-137(3) are basic container software layers that are configured to, among other container lifecycle events, spawn, start, stop, delete, etc. containers on/at the respective server.

In general, it is to be appreciated that the application containers 135(1)-135(3) and micro-services 134(1)-134(3) are "instances" (i.e., one instantiation of) a class or type of container or micro-service that may be made available to users via, for example, a container platform. For ease of description, the container instances 135(1)-135(3) are referred to simply as "containers" and the micro-services instances 134(1)-134(3) are referred to simply as "micro-services" or "container-based micro-services."

The micro-services 134(1)-134(3) within containers 135(1)-135(3) collectively form an application 150. That is, the application 150 is formed by a plurality of container-based micro-services that are distributed across the servers 130(1), 130(2), and 130(3) (i.e., across the compute cluster 132). Since the application 150 is formed by a plurality of micro-services 134(1)-134(3), the application 150 is sometimes referred to herein as a "micro-service application." Application program interfaces (APIs) are used for the communications (i.e., sending of packets) between the micro-services 134(1)-134(3).

Also as noted above, a problem with applications built using container-based micro-services is that the application developer is typically unfamiliar with the internal operations of the containers, particularly when the containers are downloaded from a publicly available container platform/registry. As such, containers may include security threats that are unknown to the application developer. These security threats are difficult to detect and address using conventional techniques. As such, in the example of FIG. 1, the techniques presented herein utilize the micro-service communications/traffic (i.e., the APIs) to protect the container-based micro-services 134(1)-134(3)), and thus the micro-service application 150, from security threats.

More specifically, shown in FIG. 1 is a computing device 142 that includes a micro-service monitoring module 144. As described further below, the computing device 142 is configured to receive records 160 of the communications/traffic associated with (i.e., sent from and/or to) the micro-services 134(1)-134(3). Using these micro-service communication records 160, the micro-service monitoring module 144 is configured to detect deviations from typical communication patterns associated with the application 150 (i.e., detect anomalies in the communication patterns) that are indicative of security issues/problems affecting the application. In certain examples, the micro-service monitoring module 144 is configured to use a plurality of micro-service communication records 160 generated from monitoring communications among executables (nodes) related to the micro-service application. An executable or node is "related to" the micro-service application when it is part of the micro-service application (i.e., a micro-service forming the application), sends traffic to a micro-service within the application, and/or receives traffic from a micro-service within the application. In addition, the micro-service monitoring module 144 may utilize a symbolic dynamics identification approach to qualitatively describe the dynamical behavior of the micro-service communications, in terms of symbol sequences obtained from the micro-service communication records 160. In these examples, the micro-service communication records 160 are observed from a dynamical system which is analyzed using grammar inference and machine learning approaches.

Figure 2:
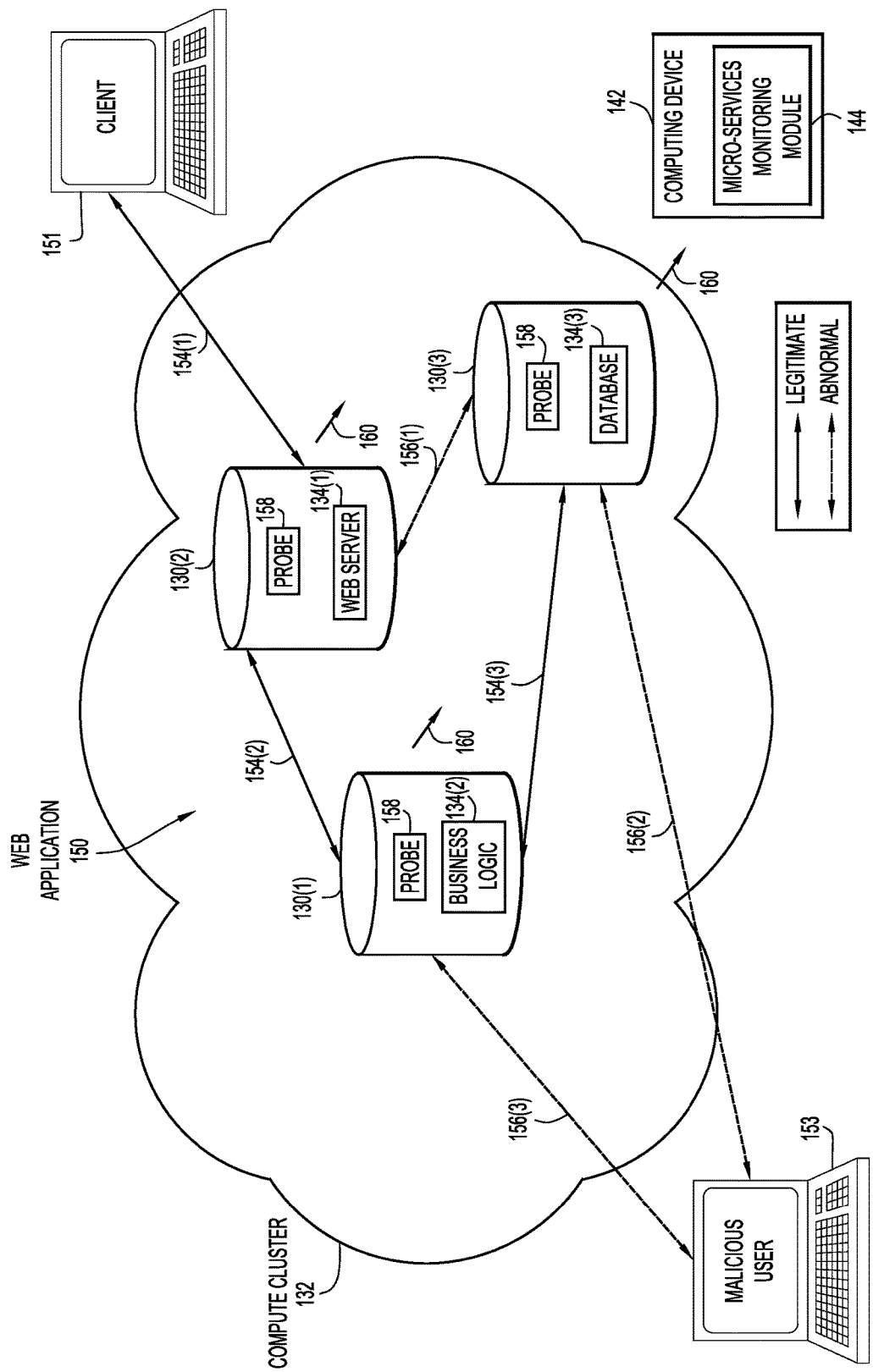
FIG. 2 is a schematic diagram illustrating monitoring of micro-service communications of a web application, according to an example embodiment.

FIG. 2 is a schematic diagram illustrating an example operational scenario in which the techniques presented herein may be employed. In particular, FIG. 2 illustrates a web application that is developed using the micro-services architecture. For ease of illustration, the example of FIG. 2 is described with reference to the network environment 110 of FIG. 1 where the web application is application 150. As such, in this example the web application 150 is formed by micro-services 134(1)-134(3), where the micro-service 134(1) is a web server micro-service, the micro-service 134(2) is a business logic micro-service, and the micro-service 134(3) is a database micro-service.

As noted above, the micro-services 134(1)-134(3) within web application 150 communicate with one another (e.g., via APIs). Communication between micro-services 134(1)-134(3) is referred to herein as intra-application communications/traffic. In addition, certain micro-services, such as web server 134(1), may communicate externally (i.e., send/receive traffic to/from devices outside of the web application 150), such as with one or more of client devices 151 and/or 153. The intra-application traffic and the traffic sent external to/from external devices (i.e., "external traffic") are collectively and generally referred to herein as "micro-service communications" or "micro-service traffic."

The micro-service communications may be legitimate (i.e., normal/typical for proper operation of the application 150) or illegitimate (e.g., malicious). In FIG. 2, arrows 154(1), 154(2), and 154(3) represent legitimate micro-service communications associated with web application 150, while arrows 156(1), 156(2), and 156(3) represent illegitimate micro-service associated with web application 150. Legitimate micro-service communications may be defined by the micro-services that send and receive the packets, more particularly, the binary executables within the micro-services that send and receive the packets, as well as the order/sequence of the communications (i.e., the communication sequence is also important to determine whether communications are legitimate).

The illegitimate micro-service communications 156(1), 156(2), or 156(3) may pose security threats to the web application 150. Therefore, as noted above, the micro-services monitoring module 144 is configured to identify the illegitimate micro-service communications based on an analysis of micro-service communication records 160. In accordance with the techniques presented herein, the micro-services monitoring module 144 uses a collection of these micro-service communication records 160 to infer global communication patterns that can lead to anomaly detection. In one example, the micro-services monitoring module 144 identifies the dynamical system that generated the collection of these micro-service communication records 160, infers a grammar, and computes a similarity metric between a sequences of symbols generated by the dynamical system and a sequence of symbols generated by the inferred grammar.

In the example of FIG. 2, the micro-service communication records 160 are generated by the various micro-services 134(1)-134(3), and the micro-service communication records 160 include fields gathered doing container introspection. Each packet sent or received by a micro-service is associated with a binary executable (process) that is uniquely identified by a unique cryptographic signature, such as a Secure Hash Algorithm 1 (SHA-1), but any other secure algorithms can also or alternative be used, within a container. This can be achieved without any agent embedded in the container through, for example, Extended Berkeley Packet Filter (eBPF) technology where probes are attached to specific functions in kernel to provide information about communication and data volume. Applications/Services are uniquely identified by using the cryptographic signature thereof after rendering on eBPF provided information. Merely for purposes of illustration, FIG. 2 illustrates at least one probe 158 at each of the servers 130(1), 130(2), and 130(3) configured to perform container introspection and to provide micro-service communication records 160 to the micro-services monitoring module 144. As noted, each micro-service communication record 160 is associated with communications/traffic (i.e. one or more packets) sent from and/or to a micro-service 134(1), 134(2), or 134(3) in web application 150.

Figure 3A:
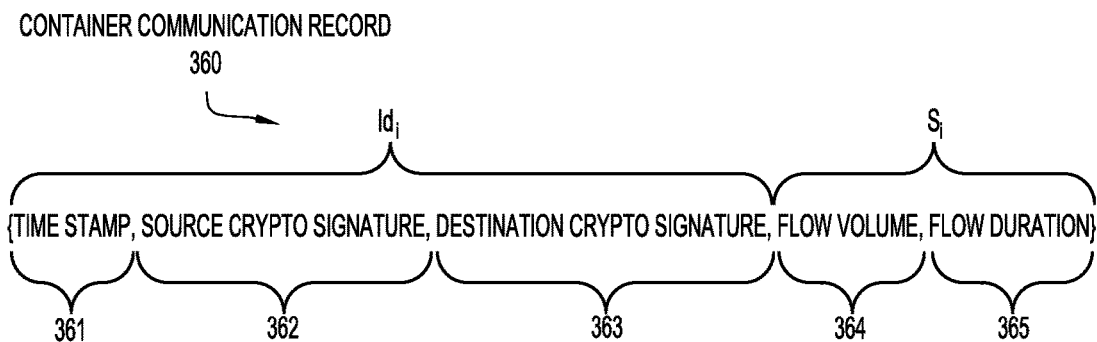
FIG. 3A is a diagram illustrating the format of a micro-service communication record, according to an example embodiment.
Figure 3B:
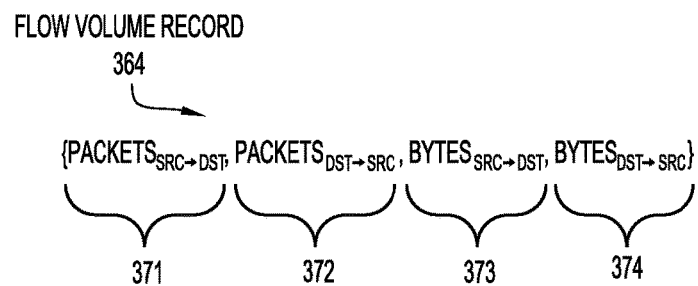
FIG. 3B is diagram illustrating further details of the micro-service communication record of FIG. 3A, according to an example embodiment.

FIG. 3A is a schematic diagram illustrating the format/arrangement of a micro-service communication record 360 in accordance with certain examples presented herein. In this example, the micro-service communication record 360 comprises a trace identifier (Id) and a time series entry (S). As such, the micro-service communication record 360 is defined as $\{Id, S\}$, a (3+D)-dimensional micro-service communication data. Each trace sequence identifier is given as: $Id_i = \{Id_i^1, Id_i^2, Id_i^3\}$, and is represented by a time stamp $(Id_i^1 = TS_i)$ 361, a source cryptographic signature $(Id_i^2 = SCS_i)$ 362, and a destination cryptographic signature $(Id_i^3 = DCS_i)$ 363. Each time series entry is given as $S_i = \{S_i^1, S_i^2\}$, and is represented by a flow volume $(S_i^1 = FV_i)$ 364, and a flow duration $(S_i^2 = FD_i)$ 365. The time stamp 361 indicates when the micro-service communication record 360 was generated and can be used to determine the order/sequence of micro-service communications within the micro-service communication records. The source cryptographic signature 362 is the unique cryptographic signature (e.g., SHA-1, SHA-2, SHA-256) associated with the binary executable that sent the traffic associated with the micro-service communication record 360, while the destination cryptographic signature 363 is the unique cryptographic signature associated with the binary executable that received the traffic associated with the micro-service communication record 360. The flow volume 364 ($FV_i$) is a 4-dimensional record that provides the number of packets/bytes transferred between the source and the destination, and the destination and the source. More specifically, as shown in FIG. 3B, the flow volume record 364 includes: entry 371 indicating the number of packets sent from the source to the destination, entry 372 indicating the number of packets sent from the destination to the source, entry 373 indicating the number of bytes sent from the source to the destination, and entry 374 indicating the number of bytes sent from the destination to the source. Finally, the flow duration 365 ($FD_i$) identifies the duration of the communication exchange between pairs of executables. The time stamp 361, the flow volume 364, the flow duration 365, collectively represent a multivariate time series where $\{TS_i, X_i\} = \{TS_i, SCS_i, DCS_i, FV_i, FD_i\}$ is a record representing the data communication exchange between source and destination nodes.

Figure 4A:
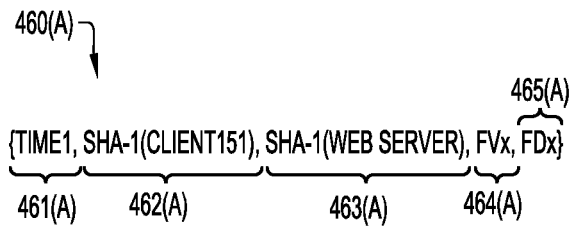
FIG. 4A is a diagram illustrating the content of a specific micro-service communication record, according to an example embodiment.
Figure 4B:
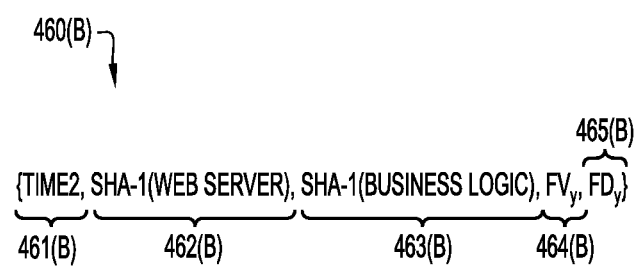
FIG. 4B is a diagram illustrating the content of another specific micro-service communication record, according to an example embodiment.
Figure 4C:
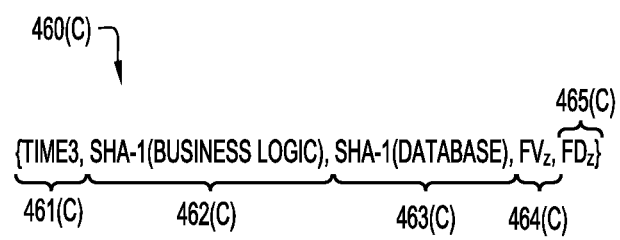
FIG. 4C is a diagram illustrating the content of another specific micro-service communication record, according to an example embodiment.

As noted, FIG. 3A illustrates an example format for a micro-service communication record, while FIG. 3B illustrates an example format for a flow volume record. FIGS. 4A, 4B, and 4C illustrate specific examples of completed micro-service communication records 460(A), 460(B), and 460(C), respectively, associated with the arrangement shown in FIG. 2.

Referring first to FIG. 4A, the micro-service communication record 460(A) includes a time stamp 461(A) given as "Time 1," a source cryptographic signature 462(A) given as "SHA-1 (client 151)," a destination cryptographic signature 463(A) given as "SHA-1 (web server)," a flow volume 464(A) given as "FV$_X$", and a flow duration 465(A) given as "FD$_X$". As such, the micro-service communication record 460(A) is associated with traffic sent from a binary executable of client device 151 to a binary executable of the web server micro-service 134(1) at a time identified as "Time 1," which included "FV$_X$" packets/bytes of data and a flow duration of "FD$_X$" seconds. In FIG. 2, this traffic is represented by arrow 154(1).

Referring next FIG. 4B, the micro-service communication record 460(B) includes a time stamp 461(B) given as "Time 2," a source cryptographic signature 462(B) given as "SHA-1 (web server)," a destination cryptographic signature 463(B) given as "SHA-1 (business logic)," a flow volume 464(B) given as "FV$_Y$", and a flow duration 465(B) given as "FD$_Y$". As such, the micro-service communication record 460(B) is associated with traffic sent from a binary executable of the web server micro-service 134(1) to a binary executable of the business logic micro-service 134(2) at a time identified as "Time 2," which included "FV$_Y$" packets/bytes of data and a flow duration of "FD$_Y$" seconds. In FIG. 2, this traffic is represented by arrow 154(2).

Referring next FIG. 4C, the micro-service communication record 460(C) includes a time stamp 461(C) given as "Time 3," a source cryptographic signature 462(C) given as "SHA-1 (business logic)," a destination cryptographic signature 463(C) given as "SHA-1 (database)," a flow volume 464(C) given as "FV$_Z$", and a flow duration 465(C) given as "FD$_Z$". As such, the micro-service communication record 460(C) is associated with traffic sent from a binary executable of the business logic micro-service 134(2) to a binary executable of the database micro-service 134(3) at a time identified as "Time 3," which included "FV$_Z$" packets/bytes of data and a flow duration of "FD$_Z$" seconds. In FIG. 2, this traffic is represented by arrow 154(3).

Returning to FIG. 2, the micro-service communication records 460(A) (FIG. 4A), 460(B) (FIG. 4B), and 460(C) (FIG. 4C) correspond to the traffic 154(1), 154(2), and 154(3) shown in FIG. 2. FIG. 2 also illustrates traffic 156(1), 156(2), and 156(3) which may also result in the generation of similar micro-service communication records. For ease of illustration, the micro-service communication records for traffic 156(1), 156(2), and 156(3) have been omitted.

The micro-service communication records are sent (e.g., via probes 158) to the micro-services monitoring module 144. As such, the micro-services monitoring module 144 receives a plurality of micro-service communication records (e.g., records 460(A), 460(B), and 460(C)). The micro-services monitoring module 144 is configured to analyze the time series entries S within the records to determine the behavior of the web application 150 during the associated time period and to analyze the trace sequence identifiers (forming a trace sequence) to determine the pattern of traffic between well identified source and destination nodes. The micro-services monitoring module 144 is further configured to determine whether the behavior of the web application 150, as indicated by the attributes of the micro-service communications (i.e., sending binary executable, receiving binary executable, sequence, volume, duration, etc.) between pairs of nodes at a given time, corresponds to expected behavior of the application. That is, the micro-services monitoring module 144 is able to infer global pattern of communications between executables running within the micro-services 134(1)-134(3) composing the application 150. In this way, the micro-services monitoring module 144 can detect possible anomalous behavior of the application 150 which, in turn, may indicate of security issues/problems affecting the application.

The analysis at micro-services monitoring module 144 may be performed in a number of different manners using a number of different techniques. However, FIG. 5 illustrates one specific example arrangement in which the micro-services monitoring module 144 uses symbolic dynamics identification techniques.

Figure 5:
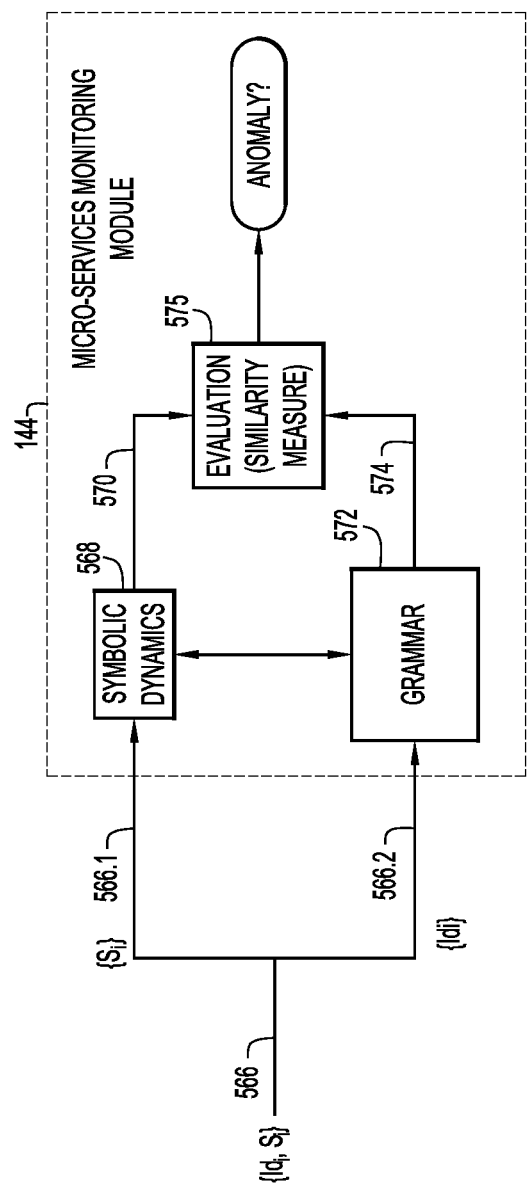
FIG. 5 is a schematic diagram illustrating operations of a micro-services monitoring module, according to an example embodiment.

More specifically, as shown by arrow 566 in FIG. 5, the micro-services monitoring module 144 receives a plurality of micro-service communication records (e.g., micro-service communication records 460(A), 460(B), 460(C), etc.) generated during a time period. As noted above, each of the micro-service communication records represented by arrow 566 include a trace sequence identifier (I) and a time series entry (S). As such, the plurality of micro-service communication records collectively represent a trace sequence $\{Id_i^2, Id_i^3\}$, shown as 566.2 and comprising the source and destination cryptographic signatures, and a time series ($S_i$) 566.1, which comprises the flow volume and the flow duration at a given time $\{Id_i^1\}$. The micro-services monitoring module 144 is configured to perform several operations based on the-service communication records 566. First, the micro-services monitoring module 144 is configured to identify the reduced dynamical system structure (dynamical system) that generated the time series ($S_i$) represented by the flow volume and the flow duration at a given time. In particular, the flow volume identifies the number of packets/bytes transferred between the source and the destination, and between the destination and the source. Second, the micro-services monitoring module 144 is configured to learn/infer the grammar, where any type of grammar in the Chomsky hierarchy can also or alternatively used, for the target language. Third, the grammar (i.e., the grammar alphabet) is extended with the trace sequence $\{Id_i^2, Id_i^3\}$, which represents source and destination cryptographic signatures as extra-symbols. Fourth, the micro-services monitoring module 144 is configured to compute a similarity metric between a sequences of symbols generated by the identified dynamical system and by the inferred grammar for detection of a possible anomalous communication patterns.

In accordance with examples presented herein, a "dynamical system" is defined as a system in which a function describes the time dependence of a point in a phase space. As such, the dynamical system identification at the micro-services monitoring module 144 involves phase space construction from the time series data (S) using delay vectors and discretization of the resultant pseudo-state space. The optimal delay embedding may be found, for example, using state-of-the art optimization routines. In operation, time series captured under nominal conditions are used to construct a nominal dynamical system according to the symbolic dynamics approach for later comparison. In other words, in the example of FIG. 5, the micro-services monitoring module 144 pre-learns a number of dynamical systems based on (from) time series captured within the web application 150 (e.g., using nominal data). Since, as noted, a dynamical system is defined as a system in which a function describes the time dependence of a point in a geometrical space, there may be multiple dynamical systems associated with a micro-services application, such as web application 150.

It is assumed that each resultant dynamical system is a linguistic source capable of generating a specific language, and that measurements of a time-series (S) (e.g., input time series 566.1) can be discretized into a corresponding sequence of symbols to form a grammar "alphabet." The cryptographic signatures for the source and the destination, included in 566.2, are used to replace each occurrence of $\{Id_i^2, Id_i^3\}$ by a new symbol, and accordingly extend the alphabet of the inferred grammar. In one example, a Long Short-Term Memory (LSTM) network for sequence-to-sequence models is used to learn a grammar and apply grammatical inference procedures to the detection of micro-services communication anomalies.

Once the grammar generated by the reduced dynamical system is learned, the grammar, defining the structural features of the words produced by the linguistic source, is a complete model for the source. As such, it is possible to use the output of the dynamical system to predict its evolution or to find which control strings lead from one state to another. Any deviation not compatible with the learned grammar in the micro-service communication production from the nominal state, originates an anomaly determination/event.

More specifically, when the micro-service communication records 566 are received at the micro-services monitoring module 144, the time series 566.1 (S) comprising the flow volume and the flow duration is presented at block 568, where the micro-services monitoring module 144 identifies the dynamical system (e.g., a selected one of the pre-learned dynamical systems) that generated the records/data within the received time series. Given the identified dynamical system, the micro-services monitoring module 144 generates an output terminal string/word 570 (i.e., a plurality of symbols) for the identified dynamical system. The output terminal string 570 is determined from the grammar associated with the identified dynamical system 568 and represents the expected behavior of the identified dynamical system.

At block 572 of FIG. 5, the micro-services monitoring module 144 infers the grammar associated with the time-series 566.2 and the trace sequence identifiers 566.1. Using the learned grammar, the micro-services monitoring module 144 generates an output terminal string/word 574. The output terminal word 574 represents the actual behavior of the web application 150, as represented in the micro-service communication records 566.

As shown in FIG. 5, the output terminal word 570 and the output terminal word 574 are provided to an evaluation block 575. In this example, the evaluation block 575 is configured to execute an anomaly detection algorithm which computes a similarity metric (similarity) between the string generated by the identified reduced dynamical system (i.e., string 570) and the string generated by the learned grammar (i.e., string 574). In one example, the similarity metric is a distance and, when the distance between the dynamical system-generated string 570 and the grammar-generated string 574 exceeds a threshold, an anomaly is reported. A reported anomaly indicates that the micro-service traffic pattern (i.e., the behavior of the application 150) is not in compliance with an expected pattern of behavior and, as such, a security threat may be present.

It is to be appreciated that the use of a distance is one example and that the evaluation block 575 may utilize other techniques for computation and/or evaluation of a similarity between strings 570 and 574. The evaluation block 575 may utilize mutual information metrics among the sequence of symbols to evaluate the similarity between strings 570 and 574. In one example, a Generative Adversarial Network (GAN) may be used to learn the similarity metric and detect the anomaly.

In summary, FIG. 5 illustrates an arrangement in which a plurality of micro-service communication records, which include time series entries and associated trace sequence identifiers, are used to describe the dynamical system that originated the plurality of micro-service communication records. The grammar is inferred from a set of sample words produced by the dynamical system, and grammar anomalies are detected based on similarity metrics.

Figure 6:
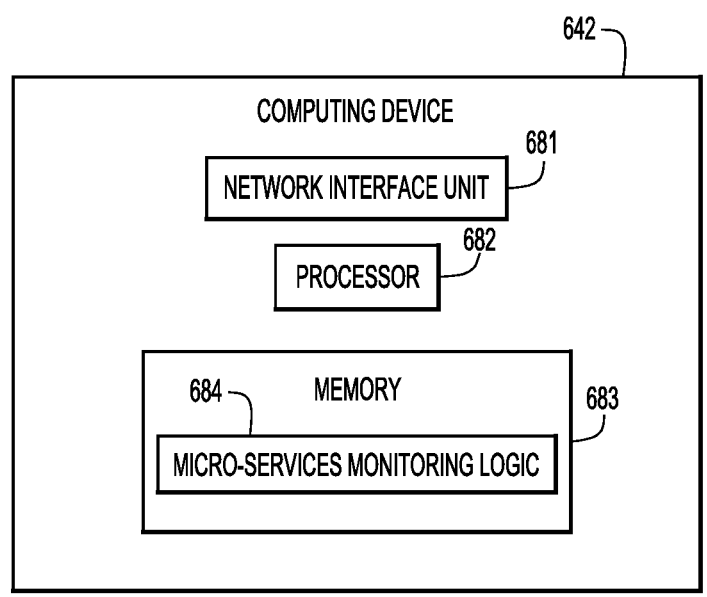
FIG. 6 is a block diagram of a computing device, according to an example embodiment.

FIG. 6 is a block diagram of a computing device (e.g., server) 642 that is configured to implement the techniques presented herein. In particular, the computing device 642 is configured to implement the micro-services monitoring techniques of a micro-services monitoring module (e.g., module 144), as described above.

The computing device 642 includes a network interface unit 681 that enables communication over a network (i.e., enables network connectivity), one or more processors 682 (e.g., microprocessors or microcontrollers), and a memory 683. The memory 683 includes/stores, among other elements, micro-services monitoring logic 684.

The memory 683 may include read only memory (ROM), random access memory (RAM), magnetic disk storage media devices, optical storage media devices, flash memory devices, electrical, optical, or other physical/tangible memory storage devices. Thus, in general, the memory 683 may comprise one or more tangible (non-transitory) computer readable storage media (e.g., a memory device) encoded with software comprising computer executable instructions and when the software is executed (by the one or more processors 682) it is operable to perform the operations described herein with reference to a micro-services monitoring module, such as micro-services monitoring module 144 of FIG. 1, FIG. 2, and/or FIG. 5.

FIG. 7 is a flowchart of a method 790 in accordance with examples presented herein that is performed at a computing device. Method 790 begins at 792 where the computing device receives a plurality of micro-service communication records each associated with traffic sent between pairs of executables that are related to a micro-services application, wherein each of the micro-service communication records includes a time series entry and an associated trace sequence identifier, and wherein the each of the micro-service communication records are generated during a time period. At 794, the computing device analyzes the plurality of micro-service communication records to detect possible anomalous communication patterns associated with the micro-services application during the time period.

The invention describes a method specific to micro-service (e.g., intra-container) communications and infer global communication patterns that may possibly lead to anomaly detection. In certain examples, a plurality of micro-service communication records (communication sequential samples) is used to generate a dynamical system according to symbolic dynamics approach, infer a grammar from data, extend the grammar's alphabet adding new symbols derived from nodes cryptographic signatures pairs, and compute a similarity metric between sequences of symbols generated by the system and by the grammar. The techniques presented herein may have a number of advantages over conventional arrangements. For example, the techniques presented herein may secure micro-service based applications without changing the habits of application developers. The presented herein may also gather micro-service communication data (communication records) without having to deploy any agent in images (agentless architecture) and may have the ability to learn communication patterns at very fine grain level, thereby making the techniques efficient to detect abnormal behaviors. The techniques presented herein may also improve computational efficiency due to the utilized symbolic representations.

In one form, a method performed at a computing device is provided. The method comprises: receiving a plurality of micro-service communication records each associated with traffic sent between pairs of executables that are related to a micro-services application, wherein each of the micro-service communication records includes a time series entry and an associated trace sequence identifier, and wherein each of the micro-service communication records is generated during a time period; and analyzing the plurality of micro-service communication records to detect possible anomalous communication patterns associated with the micro-services application during the time period.

In another form, a computing device is provided. The computing device comprises: a network interface configured to enable connectivity to a network; a memory; and one or more processors coupled to the network interface and the memory, and configured to: receive a plurality of micro-service communication records each associated with traffic sent between pairs of executables that are related to a micro-services application, wherein each of the micro-service communication records includes a time series entry and an associated trace sequence identifier, and wherein each of the micro-service communication records is generated during a time period; and analyze the plurality of micro-service communication records to detect possible anomalous communication patterns associated with the micro-services application during the time period.

In another form, one or more non-transitory computer readable storage media at a computing device are provided. The non-transitory computer readable storage media are encoded with instructions that, when executed by a processor, cause the processor to: receive a plurality of micro-service communication records each associated with traffic sent between pairs of executables that are related to a micro-services application, wherein each of the micro-service communication records includes a time series entry and an associated trace sequence identifier, and wherein each of the micro-service communication records is generated during a time period; and analyze the plurality of micro-service communication records to detect possible anomalous communication patterns associated with the micro-services application during the time period.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a computing device:
      obtaining a plurality of micro-service communication records that are each associated with traffic sent between pairs of executables that are related to a micro-services application, wherein each of the micro-service communication records includes a time series entry and an associated trace sequence identifier;
      determining, from the plurality of micro-service communication records, one or more typical communication patterns for the executables related to the micro-services application;
      obtaining one or more micro-service communication records that are associated with traffic sent between pairs of the executables related to the micro-services application, wherein the one or more micro-service communication records each include a time series entry and an associated trace sequence identifier, wherein the one or more micro-service communication records are different from the plurality of micro-service communication records, and wherein each of the one or more micro-service communication records is generated during a first time period; and
      analyzing the one or more micro-service communication records relative to the one or more typical communication patterns to detect possible anomalous communication patterns associated with the micro-services application during the first time period.

2. The method of claim 1, wherein analyzing the one or more micro-service communication records relative to the one or more typical communication patterns to detect possible anomalous communication patterns comprises:
   inferring, from the one or more micro-service communication records, at least a first pattern of communications during the first time period for the executables related to the micro-services application; and
   determining deviations between the at least first pattern of communication and at least one of the one or more typical communication patterns for the executables associated with the micro-services application.

3. The method of claim 1, wherein the traffic sent between pairs of executables that are related to the micro-services application comprise at least one of: traffic sent between pairs of micro-services forming the micro-services application, or traffic sent between a micro-service forming part of the micro-services application and a device that is not part of the micro-services application.

4. The method of claim 1, wherein analyzing the one or more micro-service communication records relative to the one or more typical communication patterns to detect possible anomalous communication patterns comprises:
   identifying a dynamical system that generated the one or more micro-service communication records;
   inferring a grammar for a target language associated with the one or more micro-service communication records;
   extending the inferred grammar with source and destination cryptographic signature identifiers included within the one or more micro-service communication records; and
   computing a similarity metric between a sequence of symbols generated by the dynamical system and a sequence of symbols generated by the extended grammar.

5. The method of claim 4, further comprising:
   pre-learning a plurality of dynamical systems associated with the micro-services application, and wherein identifying a dynamical system that generated the one or more micro-service communication records comprises selecting one of the pre-learned plurality of dynamical systems.

6. The method of claim 1, wherein each of the time series entries in the plurality of micro-service communication records and the one or more micro-service communication records comprises:
   a flow volume indicating a number of packets and bytes sent between a source executable and destination executable of the associated traffic; and
   a flow duration indicating a time duration of the communication exchange between the source executable and the destination executable.

7. The method of claim 1, wherein each of the trace sequence identifiers in the plurality of micro-service communication records and the one or more micro-service communication records comprises:

a time stamp, a cryptographic signature identifier of a source executable that sent the associated traffic, and a cryptographic signature identifier of a destination executable that received the associated traffic.

8. A computing device comprising:
a network interface configured to enable connectivity to a network;
a memory; and
one or more processors coupled to the network interface and the memory, and configured to:
obtain a plurality of micro-service communication records that are each associated with traffic sent between pairs of executables that are related to a micro-services application, wherein each of the micro-service communication records includes a time series entry and an associated trace sequence identifier;
determine, from the plurality of micro-service communication records, one or more typical communication patterns for the executables related to the micro-services application;
obtain one or more micro-service communication records that are associated with traffic sent between pairs of the executables related to the micro-services application, wherein the one or more service communication records each include a time series entry and an associated trace sequence identifier, wherein the one or more micro-service communication records are different from the plurality of micro-service communication records, and wherein each of the one or more micro-service communication records is generated during a first time period; and
analyze the one or more micro-service communication records relative to the one or more typical communication patterns to detect possible anomalous communication patterns associated with the micro-services application during the first time period.

9. The computing device of claim 8, wherein to analyze the one or more micro-service communication records relative to the one or more typical communication patterns to detect possible anomalous communication patterns, the one or more processors are configured to:
infer, from the one or more micro-service communication records, at least a first pattern of communications during the first time period for executables related to the micro-services application; and
determine deviations between the at least first pattern of communication and at least one of the one or more typical communication patterns for the executables associated with the micro-services application.

10. The computing device of claim 8, wherein the traffic sent between pairs of executables that are related to the micro-services application comprise at least one of: traffic sent between pairs of micro-services forming the micro-services application, or traffic sent between a micro-service forming part of the micro-services application and a device that is not part of the micro-services application.

11. The computing device of claim 8, wherein to analyze the one or more micro-service communication records relative to the one or more typical communication patterns to detect possible anomalous communication patterns, the one or more processors are configured to:
identify a dynamical system that generated the one or more micro-service communication records;
infer a grammar for a target language associated with the one or more micro-service communication records;
extend the inferred grammar with source and destination cryptographic signature identifiers included within the one or more micro-service communication records; and
compute a similarity metric between a sequence of symbols generated by the dynamical system and a sequence of symbols generated by the extended grammar.

12. The computing device of claim 11, wherein the one or more processors are configured to:
pre-learn a plurality of dynamical systems associated with the micro-services application, and wherein identifying a dynamical system that generated the one or more micro-service communication records comprises selecting one of the pre-learned plurality of dynamical systems.

13. The computing device of claim 8, wherein each of the time series entries in the plurality of micro-service communication records and the one or more micro-service communication records comprises:
a flow volume indicating a number of packets and bytes sent between a source executable and a destination executable of the associated traffic; and
a flow duration indicating a time duration of the communication exchange between the source executable and the destination executable.

14. The computing device of claim 8, wherein each of the trace sequence identifiers in the plurality of micro-service communication records and the one or more micro-service communication records comprises:
a time stamp, a cryptographic signature identifier of a source executable that sent the associated traffic, and a cryptographic signature identifier of a destination executable that received the associated traffic.

15. One or more non-transitory computer readable storage media at a computing device, wherein the non-transitory computer readable storage media are encoded with instructions that, when executed by a processor, cause the processor to:
obtain a plurality of micro-service communication records that are each associated with traffic sent between pairs of executables that are related to a micro-services application, wherein each of the micro-service communication records includes a time series entry and an associated trace sequence identifier;
determine, from the plurality of micro-service communication records, one or more typical communication patterns for the executables related to the micro-services application;
obtain one or more micro-service communication records that are associated with traffic sent between pairs of the executables related to the micro-services application, wherein the one or more micro-service communication records are different from the plurality of micro-service communication records, and wherein each of the one or more micro-service communication records is generated during a first time period; and
analyze the one or more micro-service communication records relative to the one or more typical communication patterns to detect possible anomalous communication patterns associated with the micro-services application during the first time period.

16. The non-transitory computer readable storage media of claim 15, wherein the instructions operable to analyze the one or more micro-service communication records relative to the one or more typical communication patterns to detect possible anomalous communication patterns comprise instructions operable to:
- infer, from the one or more micro-service communication records, at least a first pattern of communications during the first time period for the executables related to the micro-services application; and
- determine deviations between the at least first pattern of communication and at least one of the one or more typical communication patterns for the executables associated with the micro-services application.

17. The non-transitory computer readable storage media of claim 15, wherein the traffic sent between pairs of executables that are related to the micro-services application comprise at least one of: traffic sent between pairs of micro-services forming the micro-services application, or traffic sent between a micro-service forming part of the micro-services application and a device that is not part of the micro-services application.

18. The non-transitory computer readable storage media of claim 15, wherein the instructions operable to analyze the one or more micro-service communication records relative to the one or more typical communication patterns to detect possible anomalous communication patterns comprise instructions operable to:
- identify a dynamical system that generated the one or more micro-service communication records;
- infer a grammar for a target language associated with the one or more micro-service communication records;
- extend the inferred grammar with source and destination cryptographic signature identifiers included within the one or more micro-service communication records; and
- compute a similarity metric between a sequence of symbols generated by the dynamical system and a sequence of symbols generated by the extended grammar.

19. The non-transitory computer readable storage media of claim 18, further comprising instructions operable to:
- pre-learn a plurality of dynamical systems associated with the micro-services application, and wherein identifying a dynamical system that generated the one or more micro-service communication records comprises selecting one of the pre-learned plurality of dynamical systems.

20. The non-transitory computer readable storage media of claim 15,
- wherein each of the time series entries in the plurality of micro-service communication records and the one or more micro-service communication records comprises a flow volume indicating a number of packets and bytes sent between a source executable and a destination executable of the associated traffic, and a flow duration indicating a time duration of the communication exchange between the source executable and the destination executable; and
- wherein each of the trace sequence identifiers in the plurality of micro-service communication records and the one or more micro-service communication records comprises a time stamp, a cryptographic signature identifier of a source executable that sent the associated traffic, and a cryptographic signature identifier of a destination executable that received the associated traffic.

* * * * *